(No Model.)
G. S. ROBERTS.
SEWER PIPE.
No. 342,226. Patented May 18, 1886.
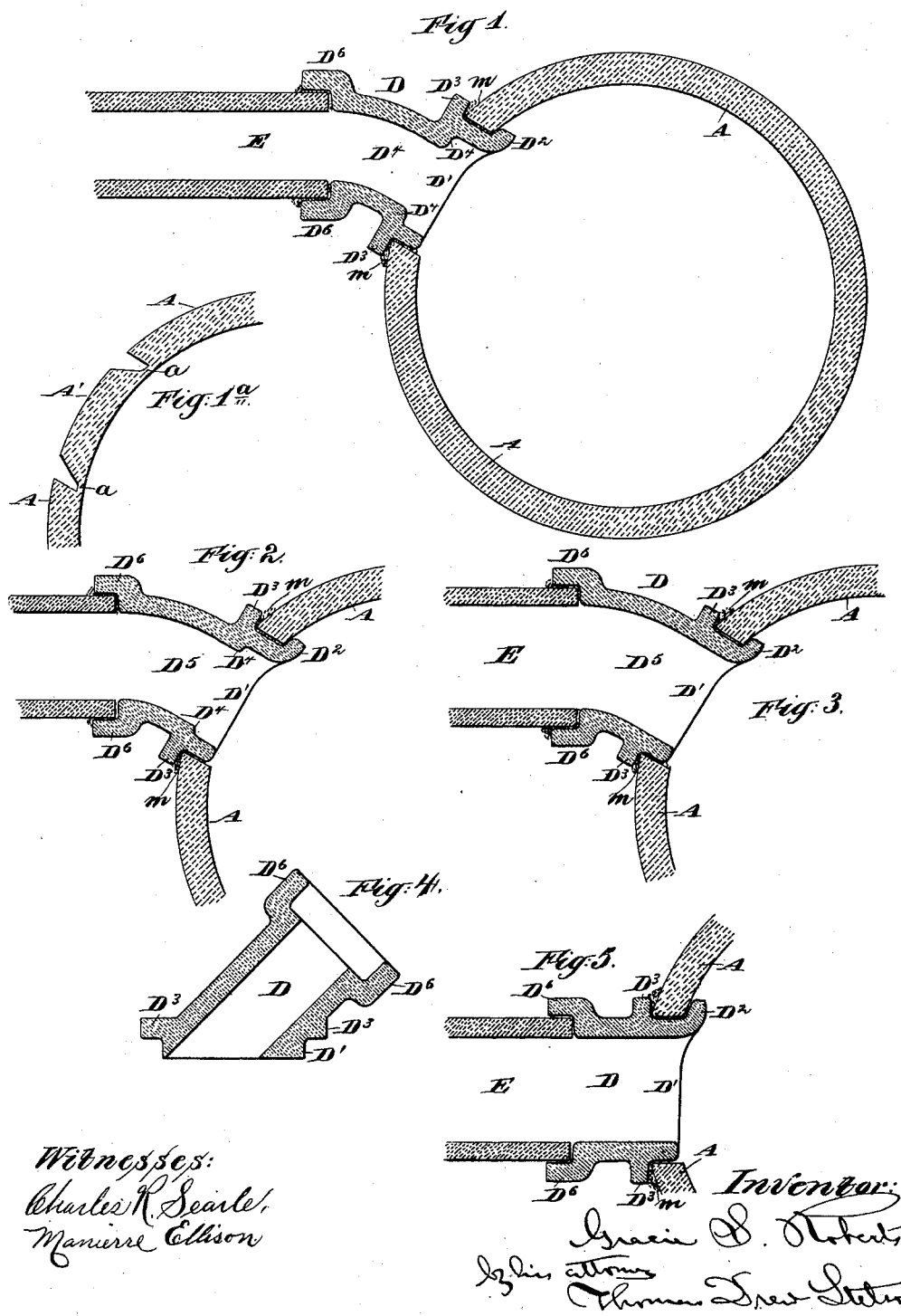

UNITED STATES PATENT OFFICE.

GRACIE S. ROBERTS, OF ROCKVILLE CENTRE, NEW YORK.

SEWER-PIPE.

SPECIFICATION forming part of Letters Patent No. 342,226, dated May 18, 1886.

Application filed January 19, 1886. Serial No. 189,062. (No model.)

*To all whom it may concern:*

Be it known that I, GRACIE S. ROBERTS, of Rockville Centre, in the county of Queens and State of New York, have invented a certain new and useful Improvement Relating to Sewer-Pipes, of which the following is a specification.

I have devised and practically wrought out an important improvement in the provisions for connecting branches to sewer-pipes. Instead of, as has been heretofore usually practiced, making the main pipe with short branches, technically "spurs," formed in one therewith, I form each branch as a separate piece, adapted to be strongly and tightly connected to a main pipe, having simply a plain hole of the proper size. I manufacture the main pipe with provisions for easily and safely producing suitable holes in the required positions.

Sewer-pipes are made of various materials. I believe that my invention may be applied successfully to pipes made of lime cements, tarry compounds, and generally to pipes of all materials, even cast-iron; but I will describe it as being applied to pipes of burned clay. It will be understood that the main body of the pipe is shaped from properly-tempered clay, molded by forcing through a die by suitable pressure, or formed in any other manner.

I produce the main pipe of practically uniform exterior, but groove around a circle or ellipse at each place where it is liable to be required to attach a branch. This enables me to break a hole with great ease. I have devised a reducer adapted to engage a small branch pipe with a larger hole in the main pipe, and to produce a proper, strong, and tight joint. I propose to manufacture several grades or sizes of reducers adapted to allow the junction of as many different sizes of branch pipes with mains having uniform holes. One style may not reduce at all, but may be adapted to join a branch of the same size as the hole in the main. I will refer to this part as a reducer. It is adapted to be entered in the hole and to engage therein by a hook, which rests against the internal surface of the main and prevents displacement of the reducer outward. There is also a stop on the reducer, adapted to engage against the exterior surface of the main pipe and prevent the displacement of the reducer inward. This outer stop is preferably in the form of a continuous collar extending quite around the reducer. The hook must be of such form as to allow the reducer to be entered by a proper movement.

The following is a description of what I consider the best means of carrying out the invention.

The accompanying drawings form a part of this specification.

Figure 1 is a section at right angles to the axis of the main pipe. It represents a branch connected to the main near the top, the junction-piece or reducer bending at a sufficient angle to connect properly to a horizontal branch. The reducer lies with its axis in a plane at right angles to the axis of the main. Fig. 2 is a corresponding section through a reducer and the adjacent parts adapted to connect a larger branch pipe. Fig. 3 is a corresponding section of what I term a "reducer," and adjacent parts adapted to engage a branch of still larger diameter. In this case, although for convenience I retain the term "reducer," the connection-piece does not actually reduce it. On the contrary, it effects the junction of a branch as large as the hole in the main. I do not consider these to be modifications. On the contrary, they are a part of the regular construction. The remaining figures show modifications. Fig. 4 is a reducer or short branch adapted to effect the junction of a branch at an acute angle with the main. This form of reducer or junction-piece requires an elliptical hole in the main. Fig. 5 is a sectional view of a reducer adapted to join a branch at right angles with the axis of the main when the hole in the main is larger. Fig. 1$^a$ is a section of a portion corresponding to Fig. 1, and showing the condition of the main before the hole is broken therein.

Similar letters of reference indicate corresponding parts in all the figures where they occur.

A is the main body of the sewer-pipe, which for brevity I will term the "main."

A' is a circular portion of the same joined to the main body A by a portion, $a$, having a greatly-diminished thickness. In the manufacture the whole may be made together of uniform thickness, a portion being afterward removed by grooving along the line $a$. The perpendicular outer face of the groove tends to reduce the raggedness which would otherwise obtain around the broken edge, and also serves to make a true bearing for the reducer.

D is the reducer, certain portions being designated when necessary by additional marks, as $D'$ $D^2$. A portion, $D'$, which engages with the main, is of a size to fit loosely in the hole to be formed in the latter. Its extreme end is provided on its upper edge with a hook, $D^2$, which performs an important function.

$D^3$ is a collar formed on the reducer, and adapted to press against the outer surface of the main when the reducer is in position. To insert the reducer, a sufficient layer of good hydraulic cement, $m$, is applied within and around the hole in the main, the reducer is tilted or inclined, inserted in the main, and adjusted in position, bringing the hook up into contact with the inner surface of the main immediately above the hole. The collar $D^3$ applying against the exterior of the main, holds the reducer against displacement inwardly. The hook $D^2$ applying against the interior of the main holds the reducer against displacement outwardly. These provisions hold the reducer in position while the mortar is soft. After the mortar is set, the junction is both strong and tight.

$D^4$ is a portion of the reducer which performs the special function of reducing. It joins the part $D'$, which is of the size corresponding to the hole in the main, with a part, $D^5$, which latter corresponds in size to the branch pipe which is to be joined. The part $D^5$ is represented as curved, but this may be varied.

$D^6$ is a bell formed in the ordinary manner on the outer end of the part $D^5$, and adapted to receive and make by the aid of cement a proper joint with a length, E, of branch pipe. This latter has a bell on its outer end, and is thereby joined to another similar length, and so on to any extent which may be required.

I provide two or three or any other required sizes or kinds of reducers. All are adapted to engage in the uniform size of hole in the main and to make a strong and tight joint therewith. Each style is adapted to engage with a different size of branch pipe E.

Modifications may be made in the forms and proportions without departing from the principle or sacrificing the advantages of the invention. I can make the hole in the main by other means than those described.

The easily-breakable part $A'$ of the main may be elliptical instead of circular. This is necessary where the branches are to be connected obliquely. Either form—the elliptical or circular—may be employed, but it is important, and it is a part of my system to make all the breakable places $A'$ of uniform size and shape. I make the reducers D always of a size and form to engage properly with the hole.

One style of what I term "reducer" should not reduce. In other words, the portion $D^5$ is of the same size as the portion $D'$. In such the part $D^4$ does not appear. The bell $D^6$ is of course in all cases sufficiently larger than the part $D^5$ to allow its receiving and making a proper junction with a branch pipe, E, of about the same size as $D^5$.

The mode of constructing the main to facilitate the production of the hole therein is made the subject of a separate application for patent.

I claim as my invention—

1. In sewer-pipes, a reducer for connection of a branch pipe to the main, having a portion, $D'$, to enter the main, a stop or collar, $D^3$, applying against the exterior of the main, and a bell, $D^6$, and connecting parts, as $D^4$ $D^5$, constructed and arranged to operate as herein specified.

2. In sewer-pipes, a reducer adapted for connecting a branch with a main having a hook, $D^2$, arranged to engage against the interior of the main, and a collar or stop, $D^3$, adapted to engage on the exterior of the main so as to hold the parts in both directions, substantially as herein specified.

3. In sewer-pipes, the reducer D, having a hook, $D^2$, in combination with the main pipe A, having an easily-separated part, $A'$, and adapted to serve therewith, as herein specified.

In testimony whereof I have hereunto set my hand at New York city, New York, this 12th day of January 1886, in the presence of two subscribing witnesses.

GRACIE S. ROBERTS.

Witnesses:
 CHARLES R. SEARLE,
 H. A. JOHNSTONE.